UNITED STATES PATENT OFFICE.

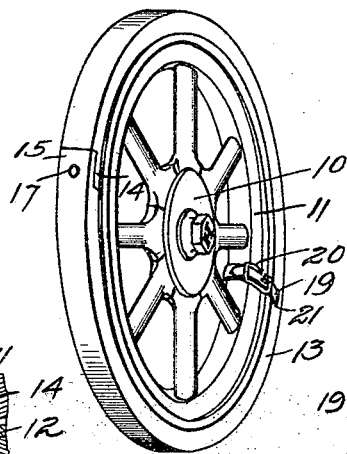
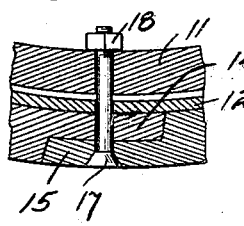
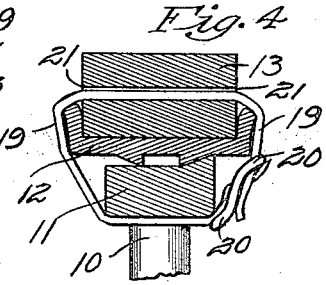
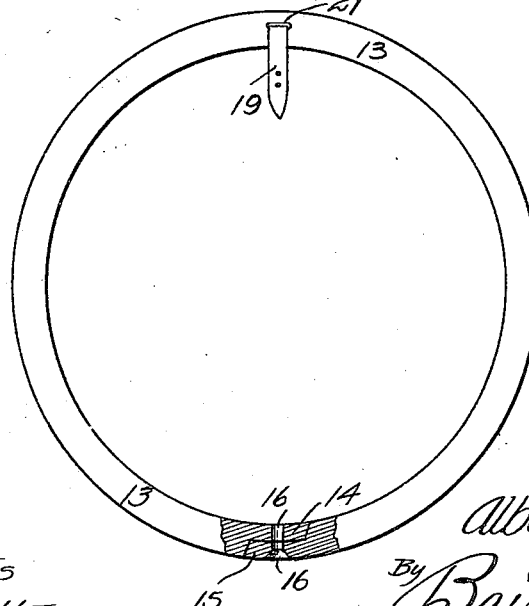

ALBERT JOHN DANIEL, OF BOONE, IOWA, ASSIGNOR OF ONE-HALF TO JOHN W. BORTZ, OF BOONE, IOWA.

EMERGENCY TIRE.

1,410,460. Specification of Letters Patent. Patented Mar. 21, 1922.

Application filed April 5, 1921. Serial No. 458,684.

*To all whom it may concern:*

Be it known that I, ALBERT J. DANIEL, a citizen of the United States, residing at Boone, in the county of Boone and State of Iowa, have invented a certain new and useful Emergency Tire, of which the following is a specification.

The object of my invention is to provide an emergency tire adapted to be secured to the rim of an ordinary wheel in place of a pneumatic tire when the pneumatic tire has been rendered inoperative from a puncture or a blow-out. The parts being of simple, durable and inexpensive construction and being still further arranged so that it may be readily and easily secured in operation position.

Still another object is to provide a resilient band having fastening means thereon whereby it may be secured to the rim of an ordinary wheel. The parts being so arranged that the entire band may lie flat or may be rolled up so that it may be stored away and occupy only a minimum amount of space.

With these and other objects in view my invention consists in the construction, arrangement and combination of the various parts of my device, whereby the objects contemplated are attained, as hereinafter more fully set forth, pointed out in my claim, and illustrated in the accompanying drawings, in which:

Figure 1 is a perspective view of a wheel of an automobile with my improved emergency tire shown thereon.

Figure 2 is a side elevation of my tire, parts being broken away and shown in section to better illustrate the construction.

Figure 3 is a sectional view taken through the ends of my tire showing how it is secured to the rim and wheel; and Figure 4 is a sectional view showing one of the fastening means for securing the tire to the wheel.

In the accompanying drawings I have used the reference numeral 10 to indicate an ordinary wheel which is provided with a felly 11. Secured to the felly 11 in the ordinary manner is a demountable rim or the like, 12.

My improved tire comprises a band 13 which is preferably formed of resilient material. The band 13 has its ends provided with rabbet portions 14 and 15, which overlap as shown in the drawings.

The rabbet portions 14 and 15 are provided with registering openings 16. The opening 16 in the rabbet portion 15 is provided with a counter-sunk portion the purpose of which will be hereafter more fully set forth.

Extending through the registering openings 16 is a bolt 17 having a nut 18 thereon. The head of the bolt 17 is received in the counter-sunk portion of the opening 16.

The bolt 17 extends through the registering openings of the band 13 and through an opening in the rim 12 and the felly 11. The openings in the rim 12 and the felly 11 are provided for ordinarily receiving the valve stem of a pneumatic tire.

By inserting the bolt through the opening provided for the valve stem it makes it possible to securely fasten the ends of the band 13 to the wheel.

The band 13 is received between the outside flanges of the rim 12, thus preventing any sideward movement of the band.

In order to more securely fasten the band 13 to the wheel I provide a strap 19 having a buckle or fastening device 20 thereon. The strap 19 extends through an opening 21 in the band 13; the strap extends around the rim 12 and the felly 11 as is clearly shown in Figure 4 of the drawings.

By securely fastening the strap in this manner makes it possible to securely hold the band 13 to the wheel.

The strap 19 extends through the band at a point substantially midway between the ends of the band so that when it is placed upon a rim and in operative position it is directly opposite from the ends of the band and the bolt 17.

The fastening strap 19 and the bolt 17 provide efficient means for securely holding the band 13 in position.

The advantages of my device are that I am able to have the band lie perfectly flat or may roll it up so that it will be received in a very small compartment and yet when the pneumatic tire that is ordinarily used on automobiles is rendered inoperative my emergency tire may be readily and easily installed in position.

Some changes may be made in the construction and arrangement of the parts of my machine without departing from the real spirit and purpose of my invention, and it is my intention to cover by my claim, any modified forms of structure or use of mechanical equivalents, which may be reasonably included within its scope.

I claim as my invention:

An emergency tire adapted to be quickly fastened on a rim, said tire being formed in a long strip of resilient material adapted to be folded up for carrying in a tool box or the like, said strip being rectangular in cross-section, the ends of said strip being rabbeted whereby they will fit together and overlap for forming a band around the rim, registering holes in said lapped ends, a bolt having a flat head adapted to extend through said holes and the hole in the rim of the wheel, a thumb-nut for quickly securing the tire to the rim in the manner described, a slot running laterally through the tire midway of its ends, and a strap having a buckle thereon to be inserted through said slot and around the rim for securely holding the tire thereto, all features of said tire thus being suited to the rapid placing of said tire on the rim.

Des Moines, Iowa, March 22nd, 1921.

ALBERT JOHN DANIEL.